(12) United States Patent
Georgis

(10) Patent No.: US 11,301,754 B2
(45) Date of Patent: Apr. 12, 2022

(54) SHARING OF COMPRESSED TRAINING DATA FOR NEURAL NETWORK TRAINING

(71) Applicant: SONY CORPORATION, Tokyo (JP)

(72) Inventor: Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 166 days.

(21) Appl. No.: 16/708,922

(22) Filed: Dec. 10, 2019

(65) Prior Publication Data

US 2021/0174197 A1 Jun. 10, 2021

(51) Int. Cl.
| | |
|---|---|
| G06N 3/08 | (2006.01) |
| G06N 3/04 | (2006.01) |
| G06N 20/20 | (2019.01) |
| G06T 11/60 | (2006.01) |
| G06T 7/00 | (2017.01) |
| H04L 29/06 | (2006.01) |
| H04L 65/60 | (2022.01) |

(52) U.S. Cl.
CPC .............. *G06N 3/08* (2013.01); *G06N 3/0454* (2013.01); *G06N 3/088* (2013.01); *G06N 20/20* (2019.01); *G06T 7/0002* (2013.01); *G06T 11/60* (2013.01); *H04L 65/601* (2013.01); *G06T 2207/20081* (2013.01); *G06T 2207/20084* (2013.01); *G06T 2207/30168* (2013.01); *G06T 2210/12* (2013.01); *G06T 2210/22* (2013.01)

(58) Field of Classification Search
CPC ........ G06N 3/08; G06N 3/0454; G06N 20/20; G06N 3/088; G06T 11/60; G06T 7/0002; G06T 2207/30168; G06T 2210/12; G06T 2210/22; G06T 2207/20084; G06T 2207/20081; H04L 65/601

USPC ......................................................... 382/155
See application file for complete search history.

(56) References Cited

U.S. PATENT DOCUMENTS

| | | |
|---|---|---|
| 7,131,136 B2 | 10/2006 | Monroe |
| 7,760,230 B2 | 7/2010 | Russell et al. |
| 2007/0296817 A1 | 12/2007 | Ebrahimi et al. |
| 2018/0137647 A1* | 5/2018 | Li .................... G06K 9/4628 |
| 2019/0156157 A1* | 5/2019 | Saito ................. G06K 9/00369 |
| 2019/0251369 A1* | 8/2019 | Popov ................ G06K 9/3258 |

(Continued)

FOREIGN PATENT DOCUMENTS

CN 107423817 A * 12/2017

*Primary Examiner* — Nay A Maung
*Assistant Examiner* — Daniella M. DiGuglielmo
(74) *Attorney, Agent, or Firm* — Chip Law Group

(57) ABSTRACT

An information processing device and method for sharing of compressed training data for neural network training is provided. The information processing device receives a first image which includes an object of interest. The information processing device extracts, from the received first image, a region of interest which includes the object of interest. Once extracted, the extracted region of interest is provided to an input layer of N numbers of layers of a first neural network, trained on an object detection task. The information processing device selects an intermediate layer of the first neural network and extracts a first intermediate result as an output generated by the selected intermediate layer of the first neural network based on the input RoI. Once extracted, the information processing device shares the extracted first intermediate result as compressed training data with a server to train a second neural network on the object detection task.

18 Claims, 4 Drawing Sheets

(56) References Cited

U.S. PATENT DOCUMENTS

2019/0335006 A1* 10/2019 George .................. G06N 20/10
2019/0385024 A1* 12/2019 Croxford ............. G06N 3/0454
2020/0134424 A1*  4/2020 Chen ...................... G06N 3/084

* cited by examiner

SHARING OF COMPRESSED TRAINING DATA FOR NEURAL NETWORK TRAINING

CROSS-REFERENCE TO RELATED APPLICATIONS/INCORPORATION BY REFERENCE

None.

FIELD

Various embodiments of the disclosure relate to deep neural networks and computer vision. More specifically, various embodiments of the disclosure relate to an information processing device and method for sharing of compressed training data for neural network training.

BACKGROUND

Advancements in object detection technology have led to development of various techniques that facilitate robust detection of objects in images. These objects may be animate or inanimate objects and neural networks are a popular means for confidence-based detection of such objects. For training such neural networks, new training datapoints may be regularly collected in batches to train and improve the accuracy of same or other neural networks with time. Typically, many conventional solutions collect and store images or videos of objects which are a part of their deployment environment. For example, a facial recognition system for a bank may collect and store images or videos of visitors and bank employees and then use the collected images or videos to improve the accuracy of the facial recognition system on a facial recognition task.

The task of collecting such new training datapoints may have confidentiality and privacy issues, especially in case of computer vision applications (e.g., Automatic License Plate Recognition (ALPR) or facial recognition), which may rely of images or videos of faces or personal information in public. Additionally, there may be bandwidth issues related to transfer of the collected high resolution (e.g., 2K, 4K, 8K) images or videos with a training server and/or cost constraints related to usage of computationally expensive servers to process all the collected images or videos. Bandwidth issues may result in long upload times and expensive network connections sometimes over mobile data.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An information processing device and method for sharing of compressed training data for neural network training is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
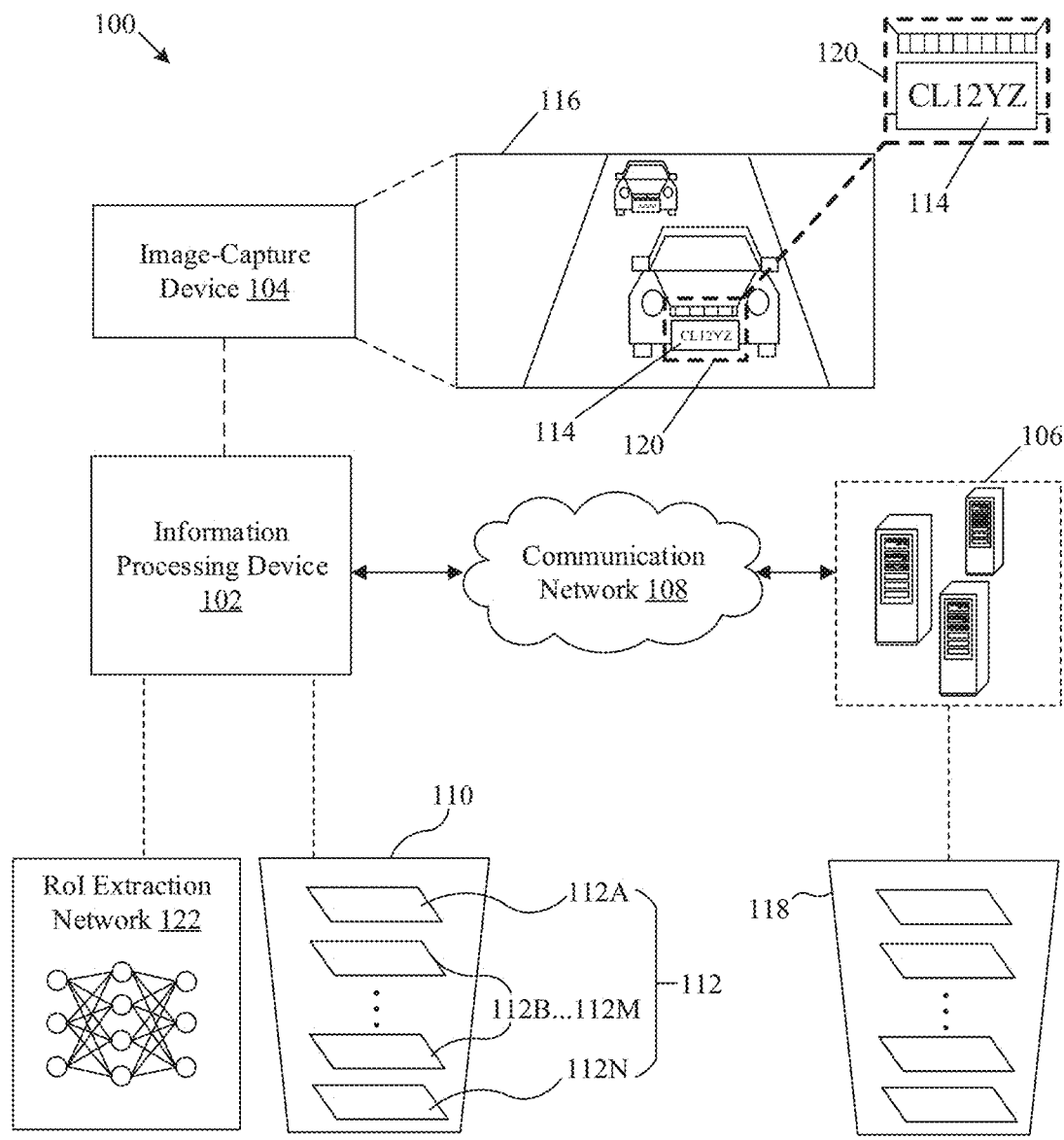
FIG. 1 is a diagram that illustrates an exemplary environment for sharing of compressed training data for neural network training, in accordance with an embodiment of the disclosure.

The following described implementations may be found in the disclosed information processing device and method for sharing of compressed training data for neural network (NN) training and NN-based object detection. Typically, the problem of training data collection for training neural network(s) has various issues, some of which are related to confidentiality and privacy issues, especially in the case of computer vision application that rely of images of faces or people in the public, bandwidth issues due to the size of high resolution videos, and expensive servers to process all image data collected from live data sources. The following disclosure addresses these issues. The disclosed information processing device may implement a resource efficient method to collect compressed training data and securely share the compressed training data with server(s) for training of neural network(s) on object detection/recognition task. The compressed training data may be acquired as intermediate results (such as feature map(s)) generated by one or more intermediate layers of a neural network, which may be trained on an object detection task and may already be deployed on the information processing device in a live environment.

Following the resource efficient method, the information processing device may receive images that includes an object of interest (for example, a license plate of vehicle) and may extract a region of interest from one of the received images. The extracted region of interest may include the object of interest. The information processing device may input the extracted region of interest to an input layer of a neural network (such as a convolutional neural network (CNN). As the size of the region of interest may be less than that of original image, it may be computationally less expensive (in terms of Floating-Point Operations (FLOPS) to process the extracted region of interest than the original image.

The information processing device may select an intermediate layer of the neural network and may extract an intermediate result (or a feature map) as output of the selected intermediate layer. The selection of the intermediate layer may be based on selection condition(s), which may include many factors and/or constraints, such as user preferences for an intermediate layer (for example, N−1 layer or N−2 layer), an extent by which any intermediate result may hide visual details of the objects in the input region of interest, or a maximum data rate supported by the communication network 108 of the information processing device for sharing the extracted intermediate result with the server(s). The present disclosure may consider some or all relevant factors, such as supported maximum data rates for transmission, user preferences for intermediate layer selection, and extent of obfuscation/loss of visual detail, before the selection of the intermediate layer is made. Therefore, it may be possible to securely collect and share the intermediate result (includes a feature map) of the selected intermediate layer, without any violation of privacy or confidentiality. Additionally, the size of intermediate result may be less than that of the original image or the input region of interest, which may result in a reduced load on transmission capacity of the communication network. It may be computationally less expensive for the server(s) to process the intermediate result in comparison with high-resolution images, which usually require costly server setups or computationally expensive computing infrastructure.

FIG. 1 is a diagram that illustrates an exemplary environment for sharing of compressed training data for neural network training, in accordance with an embodiment of the disclosure. With reference to FIG. 1, there is shown a network environment 100. The network environment 100 may include an information processing device 102, an image-capture device 104, a server 106, and a communication network 108. The information processing device 102 may be communicatively coupled to the server 106, via the communication network 108.

The information processing device 102 may include a first neural network 110 which may include N number of layers 112 and may be trained on an object detection task, such as to detect an object of interest 114 (for example, a license plate) or associated features from a first image 116. Herein, the detection of the object of interest 114 or the associated features may correspond to one of several computer vision tasks or vision applications, such as, but not limited to, character recognition, Automatic License Plate Recognition (ALPR), Air Traffic Management (ATM), facial recognition, semantic image segmentation, or multi-class classification for autonomous vehicles, robots, or other application domains.

The information processing device 102 may include suitable logic, circuitry, and interfaces that may be configured to extract intermediate result(s) generated from intermediate layer(s) of the first neural network 110 and share such intermediate result(s) as compressed training data with the server 106 for training a second neural network 118 on the object detection task. The second neural network 118 may be topologically and/or parameter-wise similar to first neural network 110 or different from the first neural network 110. Examples of the information processing device 102 may include, but are not limited to, a server, a workstation, a mainframe computer, a handheld computer, a mobile phone, a smart appliance, and/or other computing devices with image processing capability.

In FIG. 1, although the information processing device 102 and the image-capture device 104 are shown as two separate devices, in some embodiments, the entire functionality of the image-capture device 104 may be included in the information processing device 102, without a deviation from scope of the disclosure. In such cases, the information processing device 102 may be implemented as a portable device, such as a high-speed computing device, or a camera, and/or non-portable devices, such as a traffic camera. Examples of such implementation of the information processing device 102 may include, but are not limited to, a digital camera, a digital camcorder, a camera phone, a smart phone, a mobile device, a vehicle tracker device, a surveillance camera, a vehicle traffic monitoring device, a drone, a security device/camera, a computer workstation, a mainframe computer, a handheld computer, or any other computing device with a capability to capture images. In certain embodiments, the information processing device 102 may be a handheld video camera, a traffic camera, a closed-circuit television (CCTV) camera, a body camera (e.g. a police body camera), a dash camera (e.g., a dash camera on-board a police vehicle), or an in-vehicle camera.

The image-capture device 104 may include suitable logic, circuitry, and interfaces that may be configured to capture a sequence of images which may include object(s) in a field-of-view (FoV) region of the image-capture device 104. For example, the first image 116 may be one of the sequence of images captured by the image-capture device 104. Examples of implementation of the image-capture device 104 may include, but are not limited to, a semiconductor charged coupled device (CCD) based image sensor, a Complementary metal-oxide-semiconductor (CMOS) based image sensor, a backlit CMOS sensor with global shutter, a silicon-on-insulator (SOI)-based single-chip image sensor, an N-type metal-oxide-semiconductor based image sensor, a flat panel detector, or other image sensors.

The server 106 may include suitable logic, circuitry, and interfaces that may be configured to store the second neural network 118 and the compressed training data for training the second neural network 118. The server 106 may train the second neural network 118 on the object detection task based on the compressed training data. Once trained, network parameter values (such as hyperparameter values or weight information) of the second neural network 118 may be shared with the information processing device 102 to update network parameter values of the first neural network 110. The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, a cloud server, or other types of servers.

In at least one embodiment, the server 106 may be implemented as a plurality of distributed cloud-based resources by use of several technologies that are well known to those skilled in the art. A person with ordinary skill in the art will understand that the scope of the disclosure may not be limited to implementation of the server 106 and the information processing device 102 as separate entities. In certain embodiments, the functionalities of the server 106 may be incorporated in its entirety or at least partially in the information processing device 102, without departure from the scope of the disclosure.

The communication network 108 may include a communication medium through which the information processing device 102, the image-capture device 104, and the server 106 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first neural network 110 may be a computational network or a system of artificial neurons as nodes, which may be arranged in the N number of layers 112. The N number of layers 112 of the first neural network 110 may include an input layer 112A, a plurality of intermediate layers 112B . . . 112M (also referred to as hidden layers), and an output layer 112N. Each layer of the N number of layers 112 may include one or more nodes (artificial neurons). Outputs of all nodes in the input layer 112A may be coupled to at least one node of the plurality of intermediate layers 112B . . . 112M. Similarly, inputs of each intermediate layer may be coupled to outputs of at least one node in other layers of the first neural network 110. Outputs of each intermediate layer may be coupled to inputs of at least one node in other layers of the first neural network 110. Node(s) in the output layer 112N may receive inputs from at least one intermediate layer to output a result. The number of layers and the number of nodes in each layer may be determined from hyper-parameters of the first neural network 110. Such hyper-parameters may be set before or while training the first neural network 110 on a training dataset of images or videos.

Each node of the first neural network 110 may correspond to a mathematical function (e.g., a sigmoid function or a rectified linear unit) with a set of network parameters, tunable during training of the first neural network 110. The set of network parameters may include, for example, a weight parameter, a regularization parameter, and the like. Each node may implement a mathematical function to compute an output based on one or more inputs from nodes in other layer(s) (e.g., previous layer(s)) of the first neural network 110. All or some of the nodes of the first neural network 110 may correspond to same or a different mathematical function.

In training of the first neural network 110, one or more network parameters of each node of the first neural network 110 may be updated based on whether an output of the output layer 112N for a given input (from the training dataset) matches a correct result based on a loss function for the first neural network 110. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

The first neural network 110 may include electronic data, which may be implemented, for example, as a software component, and may rely on code databases, libraries, external scripts, or other logic or instructions for execution by a processing device, such as by the information processing device 102. The first neural network 110 may include code and routines that may be utilized to configure a computing device, such as the information processing device 102, to perform one or more operations for detection of object of interest 114 from an image (for example, the first image 116). Additionally, or alternatively, the first neural network 110 may be implemented using hardware, including, but not limited to a processor, a microprocessor (e.g., to perform or control performance of one or more operations), a field-programmable gate array (FPGA), or an application-specific integrated circuit (ASIC). Alternatively, in some embodiments, the first neural network 110 may be implemented using a combination of both hardware and software components.

The first neural network 110 may be a Deep Neural Network (DNN) or a Hybrid Network of one or more variants of DNNs, such as, but not limited to, Convolutional Neural Network (CNN), CNN-Recurrent Neural Network (CNN-RNN), R-CNN, Fast R-CNN, Faster R-CNN, Artificial Neural Network (ANN), (You Only Look Once) YOLO Network, Long Short Term Memory (LSTM) based RNN, CNN+ANN, LSTM+ANN, Gated Recurrent Unit (GRU)-based RNN, Fully Convolutional Network (FCN), Densely Connected Neural Networks (also referred to as Dense Nets), Hybrid Network of CNN and Connectionist Temporal Classification (CTC) based RNN, Deep Bayesian Network, Generative Adversarial Network (GAN), and/or a combination of such networks.

In operation, the information processing device 102 may control the image-capture device 104 to capture a sequence of images (or a video) of a scene in the FoV of the image-capture device 104. The captured sequence of images may include the first image 116 which includes the object of interest 114. The object of interest 114 may correspond to an object which may need to be detected and/or recognized by the first neural network 110. For example, the object of interest 114 may be one of: a licensing plate of a vehicle, identification information (for example, airplane detection for ATM) of a flying vehicle, a human face, an animate object, or an inanimate object.

The image-capture device 104 may share the captured first image 116 with the information processing device 102. The information processing device 102 may receive the first image 116 from image-capture device 104 and may extract a region of interest (hereinafter, "RoI") 120 from the first image 116. The RoI 120 may include the object of interest 114 or a portion of the object of interest 114. By way of example, and not limitation, the RoI 120 may be extracted based on application of an RoI extraction network 122 on the received first image 116. The RoI extraction network 122 may be a neural network which may be trained to determine a bounding box within or around the object of interest 114. The information processing device 102 may extract the RoI 120 by cropping a region within the bounding box. The RoI extraction network 122 may be trained on a dataset which may contain image pairs for training and for training validation. Each image pair may include an input image and a labelled output.

The information processing device 102 may input the extracted RoI 120 to the input layer 112A of the first neural network 110. The output layer 112N of the first neural network 110 may generate an output (i.e. a detection result) for the input RoI 120. As the first neural network 110 processes the input RoI 120, the plurality of intermediate layers 112B . . . 112M may generate a plurality of intermediate results. Each intermediate result may be a feature map, which may be generated at an auxiliary stride. The auxiliary stride may be an integer multiple of one (1), i.e. an initial stride for the input RoI 120 for the input layer 112A. The value of the auxiliary stride may increase with each subsequent layer of the first neural network 110. With every increase in the auxiliary stride, the size of the feature map at that auxiliary stride may be reduced.

The information processing device 102 may select an intermediate layer (for example, an intermediate layer 112M) of the N number of layers 112 of the first neural network 110. From the N number of layers 112, the selected intermediate layer may be one of: N−1 to layer (the intermediate layer 112M), N−2th layer, or N−3th layer. The selection of the intermediate layer may be based on one or more selection conditions for intermediate layer selection. For example, one of the selection conditions may require that the feature map should be from an intermediate layer for which the visual representation of the feature map is visually obfuscated to a level where the feature map is visually unrelatable to the input RoI 120. If an unauthenticated network gets access to the feature map, it may be impossible for the outsider network to extract the original input, such as the input RoI 120 from the feature map. Further details of such selection conditions are provided in detail, for example, in FIG. 3.

The information processing device 102 may extract a first intermediate result as an output generated by the selected intermediate layer of the first neural network 110 based on the input RoI 120. For example, if the first neural network 110 is a CNN, then the first intermediate result may include a convolutional feature map associated with the object of interest 114. The information processing device 102 may store the extracted first intermediate result in memory (as shown in FIG. 2) of the information processing device 102 and may share the first intermediate result as the compressed training data with the server 106, via the communication network 108, for training the second neural network 118 on the object detection task.

Figure 2:
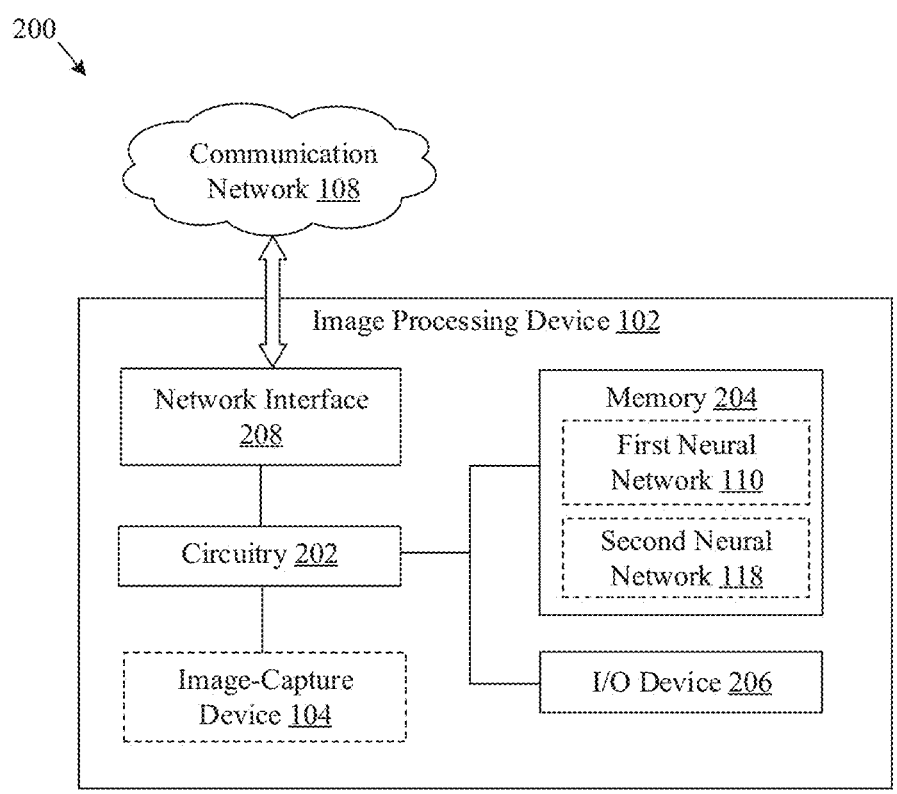
FIG. 2 is a block diagram that illustrates an exemplary information processing device for sharing of compressed training data for neural network training, in accordance with an embodiment of the disclosure.

FIG. 2 is a block diagram that illustrates an exemplary information processing device for sharing of compressed training data for neural network training, in accordance with an embodiment of the disclosure. FIG. 2 is explained in conjunction with elements from FIG. 1. With reference to FIG. 2, there is shown a block diagram 200 of the information processing device 102. The information processing device 102 may include circuitry 202, which may perform operations for neural network-based object detection and for sharing of compressed training data for neural network training. The information processing device 102 may further include a memory 204, an input/output (I/O) device 206, and a network interface 208. The image-capture device 104 may be included in the information processing device 102 or may be coupled with the information processing device 102, via the communication network 108. The circuitry 202 may be communicatively coupled to the memory 204, the I/O device 206, the network interface 208, and the image-capture device 104.

The circuitry 202 may include suitable logic, circuitry, and/or interfaces that may be configured to execute program instructions associated with different operations to be executed by the information processing device 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 202 may include any number of processors configured to, individually or collectively, perform or direct performance of any number of operations of the information processing device 102, as described in the present disclosure. Additionally, one or more of the processors may be present on one or more different electronic devices, such as different servers. In some embodiments, the circuitry 202 may be configured to interpret and/or execute program instructions and/or process data stored in the memory 204 and/or a persistent data storage. In some embodiments, the circuitry 202 may fetch program instructions from a persistent data storage and load the program instructions in the memory 204. After the program instructions are loaded into the memory 204, the circuitry 202 may execute the program instructions. Some of the examples of the circuitry 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, interfaces, and/or code that may be configured to store the program instructions executable by the circuitry 202. The memory 204 may be configured to store the first neural network 110, trained for the object detection task and/or intermediate results generated by the plurality of intermediate layers 112B . . . 112M of the first neural network 110. In certain embodiments, the memory 204 may be configured to store operating systems and associated application-specific information.

The memory 204 may include computer-readable storage media for carrying or having computer-executable instructions or data structures stored thereon. Such computer-readable storage media may include any available media that may be accessed by a general-purpose or a special-purpose computer, such as the circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 202 to perform a certain operation or a group of operations associated with the information processing device 102.

The I/O device 206 may include suitable logic, circuitry, and interfaces that may be configured to receive an input and provide an output based on the received input. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, and interfaces that may be configured to facilitate communication between the circuitry 202 and the server 106, via the communication network 108. The network interface 208 may be implemented by use of various known technologies to support wired or wireless communication of the information processing device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the information processing device 102, as described in FIG. 1, may be performed by the circuitry 202. Operations executed by the circuitry 202 are described in detail, for example, in FIG. 3.

Figure 3:
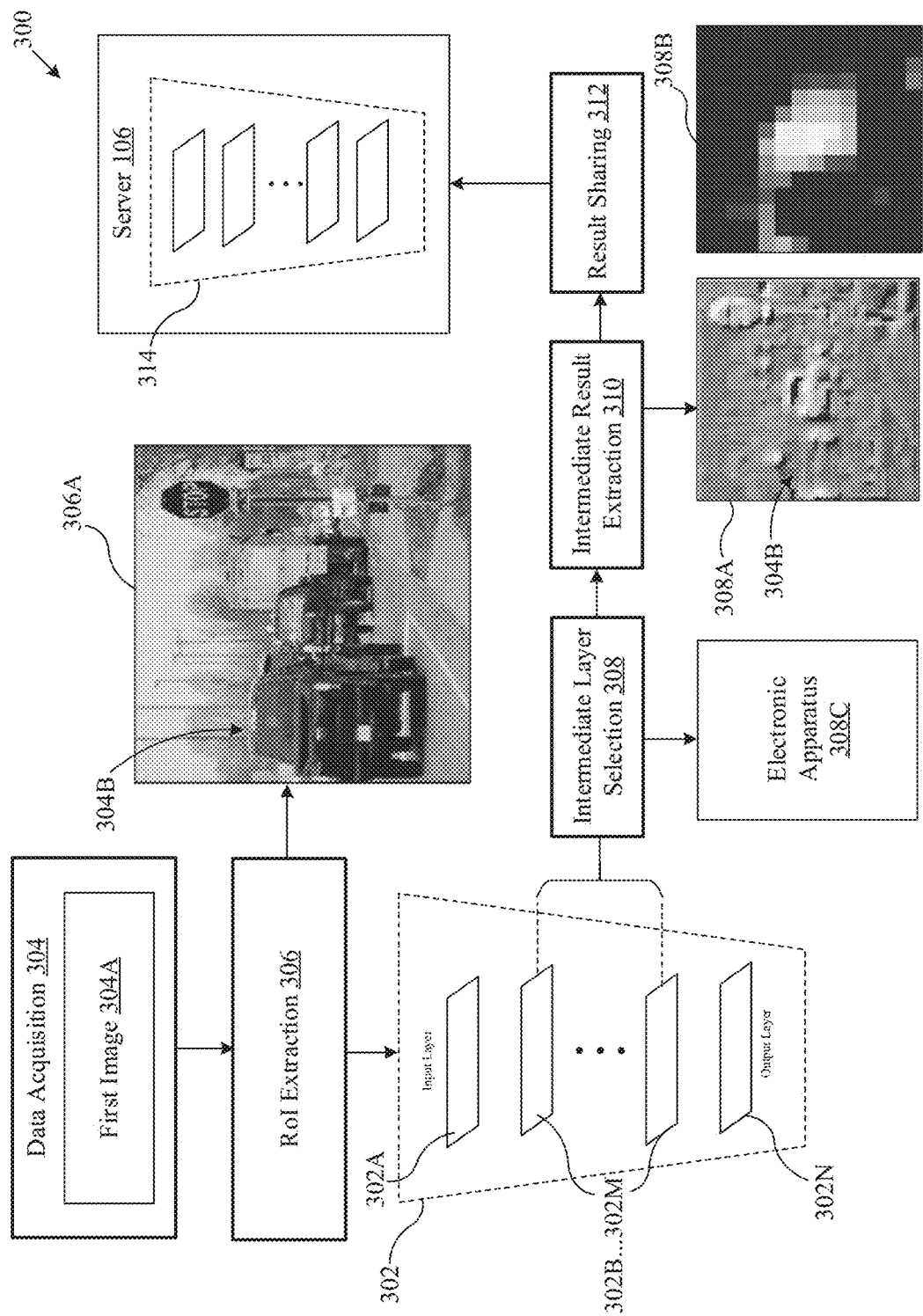
FIG. 3 is a diagram that illustrates exemplary operations for sharing of compressed training data for neural network training, in accordance with an embodiment of the disclosure.

FIG. 3 is a diagram that illustrates exemplary operations for sharing of compressed training data for neural network training, in accordance with an embodiment of the disclosure. FIG. 3 is explained in conjunction with elements from FIG. 1 and FIG. 2. With reference to FIG. 3, there is shown a block diagram 300 that includes a first neural network 302. The first neural network 302 may include N number of layers and may be a CNN, a variant of CNN, or a hybrid neural network, as also described in FIG. 1. The N number of layers of the first neural network 302 may include an input layer 302A, an output layer 302N and a plurality of intermediate layers 302B . . . 302M (which acts as hidden layers of the first neural network 302). The block diagram 300 further includes a set of operations from 304 to 312 for sharing of compressed training data for neural network training of a second neural network 314, as described herein.

At 304, data acquisition may be performed. For data acquisition, the information processing device 102 may control the image-capture device 104 to capture a first image 304A which may be of a scene that includes an object of interest 304B in a FoV of the image-capture device 104. For example, the object of interest 304B may be a license plate of a vehicle, identification information of a flying object (airplane), a human face, an animate object, or an inanimate object. Once captured, the image-capture device 104 may share the captured first image 304A with the information processing device 102 for detection of the object of interest 304B. The information processing device 102 may receive the first image 304A from the image-capture device 104.

Other than object(s) of interest, images typically include noisy objects. For example, for ALPR, images usually contain noisy objects, such as vehicles, trees, road, or traffic signs. For object detection, it may be computationally expensive and inefficient to use the first neural network 302 to process an entire image of a scene to detect or recognize an object (e.g., license plate number) which may only occupy a small patch of the entire image. Therefore, RoI extraction may be needed, as described herein.

At 306, RoI extraction may be performed. For RoI extraction, the information processing device 102 may extract, from the received first image 304A, an RoI 306A that includes the object of interest 304B. By way of example, and not limitation, the RoI 306A may be extracted from the received first image 304A based on application of the RoI extraction network (such as the RoI extraction network 122) on the received first image 304A. The RoI extraction network may be trained to determine a bounding box as the RoI 306A around the object of interest 304B in the received first image 304A. The RoI 306A may be extracted by cropping a region within the bounding box. Once cropped, the size of the extracted RoI 306A may be relatively much smaller than the size of original image, i.e. the first image 304A. For example, if the first image 304A is of 4K resolution, 3840× 2160 pixels, then the RoI 306A can be 200×200 pixels. It may be computationally less expensive (e.g., in terms of a reduced number of Floating Point Operations (FLOPS)) to process the RoI 306A of 200×200 pixels in comparison with 1K resolution of the first image 304A.

The information processing device 102 may input the extracted RoI 306A to the input layer 302A of the first neural network 302. As the first neural network 302 is trained for the object detection task, the first neural network 302 may process the input RoI 306A to detect the object of interest 304B and output, via the output layer 302N, a classification result, which may include a class label for the detected object of interest 304B.

At 308, intermediate layer selection may be performed. The information processing device 102 may select an intermediate layer (such as an intermediate layer 302M) of the first neural network 302. In one embodiment, the intermediate layer may be selected as one of last three layers of the plurality of intermediate layers 302B . . . 302M. Specifically, for N number of layers, the intermediate layer may be selected as one of: N−3 layer, N−2 layer, or N−1 layer, which is just before the output layer 302N (i.e. Nth layer). The selection of the intermediate layer may be based on one or more selection conditions for the intermediate layer selection, as described herein. One of the selection condition may specify a customer or user preference for specific intermediate layer(s), intermediate results of which may be shared with the server 106 for fine-tuning and re-training the second neural network 314, which may be a copy of the first neural network 302 on the server 106.

For example, if the first neural network 302 is a 100 layer CNN, then a user preference may be determined based on negotiations or agreement with users. If the users agree that the intermediate result of the N−1 layer (if N is the output layer 302N) hides or obfuscates enough information from the original scene of input RoI 306A but N−2 layer does not, then N−1 layer may be stored as a user preference for the intermediate layer selection. Additionally, or alternatively, if users agree to select either of N−1 layer or N−2 layer, then N−2 layer may be preferred for the intermediate layer selection as the intermediate result of the N−1 layer can be locally generated on the server 106.

Additionally, or alternatively, if both N−1 layer and N−2 layer can be selected but the transmission channel of the communication network 108 only allows transmission at lower bitrates, then the N−1 layer may be selected over N−2 layer or N−3 layer. This may be because as we move from the input layer 302A to the output layer 302N, the stride level increases with each subsequent layer. With increase in the stride level, the size (e.g., resolution) of the intermediate result decreases. Therefore, if the intermediate results of N−2 layer and N−1 layer are 24×24 and the 12×12, respectively, then N−1 layer may be selected in situations where the transmission channel is constrained to transmit data over lower bitrates.

By way of example, and not limitation, police vehicles typically operate over mobile data which is typically limited by data rates. So, if the first neural network 302 is implemented on a camera which is onboard the police vehicle and is for detection of blacklisted license plate numbers of stolen or suspect vehicles, then N−1 layer may be selected instead of N−2 layer.

By way of another example, and not limitation, users may be allowed to negotiate or specify intermediate layers (M layers, i.e. N−1 layer, N−2 layer, . . . , N-M layer), results of which may be allowed to be transmitted and shared with the server 106 for training of the second neural network 314. Thereafter, from the specified intermediate layers, the information processing device 102 may determine a subset (T layers, i.e. N−1, N−2, . . . , N-T, where T<=M) which can be shared based on communication channel costs. Finally, the information processing device 102 may select N-T layer because intermediate results of N−1 layer, N−2 layer and up to N−T−1 layer can be generated locally on the server 106 based on the intermediate result of the N−T layer.

In another embodiment, the information processing device 102 may extract a plurality of intermediate results as an output generated the plurality of intermediate layers 302B . . . 302M based on the input RoI 306A. Once extracted, one of the plurality of intermediate results may be selected and compared with each of remaining intermediate results. The above process may be repeated for every intermediate result. The information processing device 102 may select a first intermediate result 308A from the extracted plurality of intermediate results and may compare the selected first intermediate result 308A with each of the plurality of intermediate results based on one or more selection conditions. Based on such comparison, the information processing device 102 may select the first intermediate layer.

As an example, if the first neural network 302 is a CNN, then the intermediate result from each intermediate layer may be a convolutional feature map (with N channels). As the convolutional feature map may be compared with other convolutional feature maps from other intermediate layers, it may be determined whether the convolutional feature map sufficiently obfuscates or hides visual details of the object of interest 304B, as included in the input RoI 306A. As one of the one or more selection conditions, the convolutional feature map should be compressed or obfuscated enough to an extent that it may be computationally intractable for any computing system to reconstruct the input RoI 306A back from the convolutional feature map.

In another embodiment, the information processing device 102 may extract two intermediate results, i.e. the first intermediate result 308A and a second intermediate result 308B as outputs generated by two of the N number of layers of the first neural network 302 based on the input RoI 306A. Thereafter, the information processing device 102 may compare the first intermediate result 308A with the second intermediate result 308B to generate a comparison result which may be transmitted to an electronic apparatus 308C associated with a user. The comparison result may include information which may differentiate a visual quality of the first intermediate result 308A from that of the second intermediate result 308B. For example, the comparison result may include stride levels of the two intermediate layers, layer position or index (1, 2 . . . N−1, N), image size (in terms of bytes), image resolution values, or a qualitative measure of the visual details, such as values of compression artifacts, Gaussian blur, or pixelation. Based on the comparison result, the user may be able to select one of the first intermediate result 308A or the second intermediate result 308B via the electronic apparatus 308C. Once selected, the information processing device 102 may receive, from the electronic apparatus 308C, selection information as one of the one or more selection conditions for intermediate layer selection. Based on the one or more selection conditions, the information processing device 102 may select the intermediate layer.

In another embodiment, the information processing device 102 may determine network information associated with the communication network 108 between the information processing device 102 and the server 106. The network information may include at least one of: a communication bit rate, a network topology associated with the communication network 108, or an encryption method associated with the communication network 108. The information processing device 102 may select the intermediate layer based on a determination that the determined network information satisfies one or more selection conditions for the intermediate layer selection. For example, the selection condition may include a constraint that the selected intermediate layer should produce an intermediate result which can be transmitted at data rates supported by the communication network 108. In some instances, a network test may be independently executed to determine the network information and to determine a maximum data rate which the communication network 108 can support. Another selection condition may include a constraint that that a transmission of the intermediate result from the selected intermediate layer should not clog a bandwidth of the communication network 108. In such a case, an intermediate layer whose output can be transmitted to the server 106 in less time may be selected.

At 310, intermediate result extraction may be performed. The information processing device 102 may extract the first intermediate result 308A as an output generated by the selected intermediate layer of the first neural network 302 based on the input RoI 306A. In case the first neural network 302 is a CNN, then the extracted first intermediate result 308A may include a convolutional feature map associated with the object of interest 304B in the input RoI 306A, as shown. Instead of storing the first image 304A or the extracted RoI 306A, the information processing device 102 may store the extracted first intermediate result 308A in the memory 204. Additionally, or alternatively, the extracted first intermediate result 308A may be shared with the server 106 via the communication network 108, as described herein.

At 312, result sharing may be performed. The information processing device 102 may share the extracted first intermediate result 308A as compressed training data with the server 106 for training the second neural network 314 on the object detection task. Herein, the second neural network 314 be either a copy of the first neural network 302 (pretrained) or a different neural network with a network topology same as that of the first neural network 302 or different from the first neural network 302. For example, if the first neural network 302 is a CNN with 100 layers, then the second neural network 314 may be a local copy of the 100 layer CNN on the server 106 (with updated weights).

As the extracted first intermediate result 308A sufficiently hides or obfuscates visual details of the object of interest 304B, it may be suitable to share the first intermediate result 308A as compressed training data with the server 106. The server 106 may regularly retrain the second neural network 314 on new training datapoints (i.e. the compressed training data), without any violation of user privacy or confidentiality. Once retrained, the detection/classification accuracy of the second neural network 314 may improve on the object detection task.

In at least one embodiment, the information processing device 102 may receive, from the server 106, network parameter values of the second neural network 314 after the second neural network 314 is trained on the compressed training data. Once received, the first neural network 302 may be updated based on the received network parameter values. With the update, the first neural network 302 may be able to detect/classify new or same type of objects in input images with a better accuracy or confidence.

Figure 4:
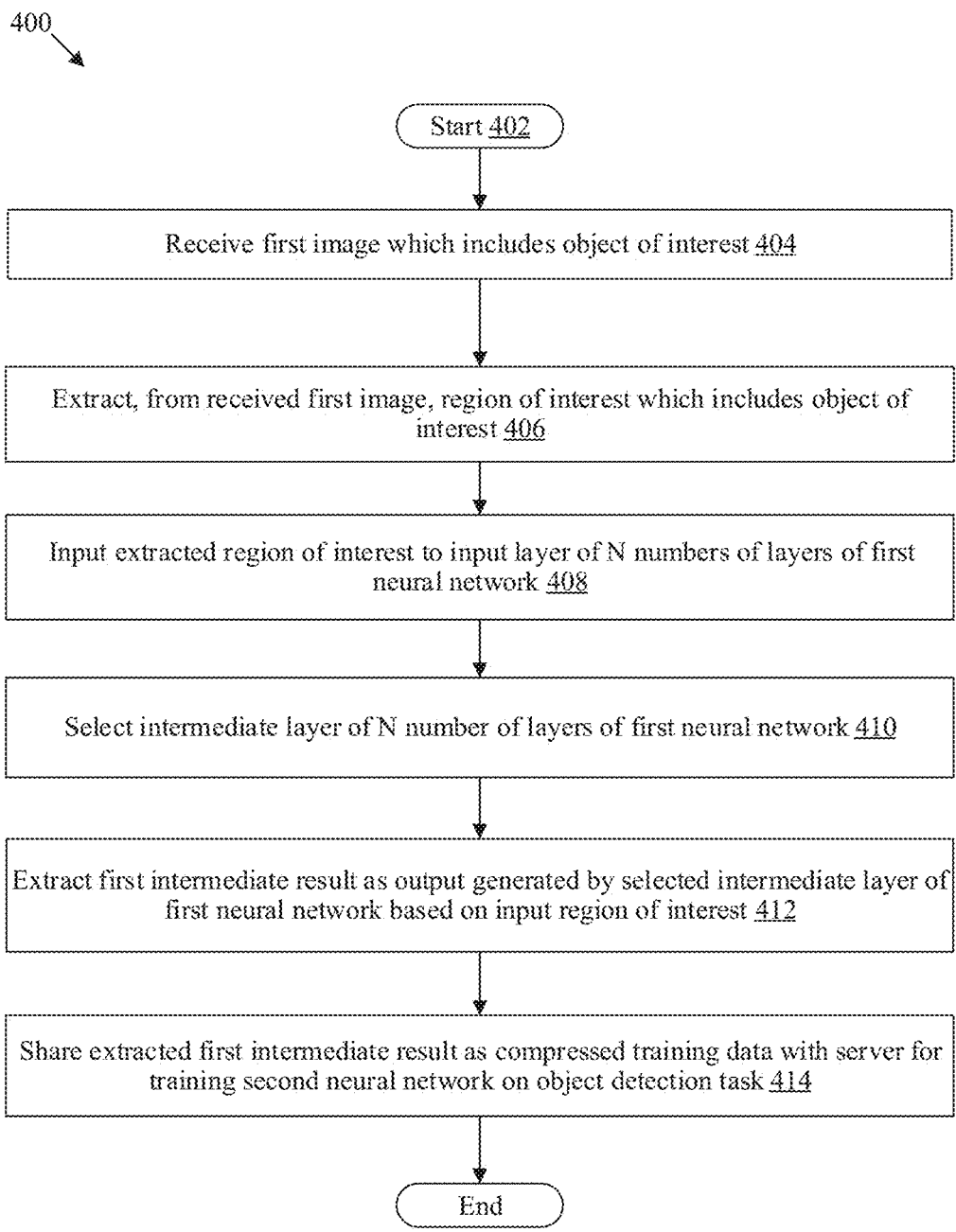
FIG. 4 is a flowchart that illustrates exemplary operations for sharing of compressed training data for neural network training, in accordance with an embodiment of the disclosure.

FIG. 4 is a flowchart that illustrates exemplary operations for sharing of compressed training data for neural network training, in accordance with an embodiment of the disclosure. FIG. 4 is explained in conjunction with elements from FIGS. 1, 2, and 3. With reference to FIG. 4, there is shown a flowchart 400. The operations from 402 to 414 may be executed by any computing system, for example, by the information processing device 102 of FIG. 2. The method illustrated in the flowchart 400 may start at 402 and may proceed to 404.

At 404, the first image 116 that includes the object of interest 114 may be received. In at least one embodiment, the circuitry 202 may receive the first image 116 that includes the object of interest 114.

At 406, the RoI 120 may be extracted from the received first image 116. The RoI 120 may include the object of interest 114. In at least one embodiment, the circuitry 202 may extract the RoI 120 which may include the object of interest 114.

At 408, the extracted RoI 120 may be provided as input to the input layer 112A of the N numbers of layers 112 of the first neural network 110. In at least one embodiment, the circuitry 202 may input the extracted RoI 120 to the input layer 112A of the N numbers of layers 112 of the first neural network 110.

At 410, an intermediate layer of the N number of layers 112 of the first neural network 110 may be selected. The intermediate layer may be selected based on one or more selection conditions, as described, for example, in FIG. 1 and FIG. 3.

At 412, a first intermediate result may be extracted as an output generated by the selected intermediate layer of the first neural network 110 based on the input RoI 120. In at least one embodiment, the circuitry 202 may extract the first intermediate result as the output of the selected intermediate layer of the first neural network 110.

At 414, the extracted first intermediate result may be shared as compressed training data with the server 106 for training the second neural network 118 on the object detection task. In at least one embodiment, the circuitry 202 may share the extracted first intermediate result as compressed training data with the server 106 for training the second neural network 118 on the object detection task. Control may pass to end.

Various embodiments of the disclosure may provide a non-transitory computer readable medium and/or storage medium having stored thereon, instructions executable by a machine and/or a computer to operate an information processing device. The instructions may cause the machine and/or computer to perform operations that include receiving a first image which includes an object of interest and extracting, from the received first image, a RoI that includes the object of interest. The operations further include inputting the extracted RoI to an input layer of N numbers of layers of a first neural network which is trained for an object detection task. The operations further include selecting an intermediate layer of the N number of layers of the first neural network and extracting a first intermediate result as an output generated by the selected intermediate layer of the first neural network based on the input RoI. The operations further include sharing the extracted first intermediate result as compressed training data with a server for training a second neural network on the object detection task.

Exemplary aspects of the disclosure may include an electronic device (such as the information processing device 102 of FIG. 1) that includes circuitry (such as the circuitry 202) and a memory (such as the memory 204 of FIG. 2) configured to store a first neural network (such as the first neural network 110) trained for an object detection task. The first neural network may include N number of layers (such as the N number of layer 112). The circuitry may be configured to receive a first image (such as the first image 116) which includes an object of interest (such as the object of interest 114). The circuitry may be further configured to extract, from the received first image, a region of interest (such as the RoI 120) which includes the object of interest. Once extracted, the circuitry may be further configured to input the extracted RoI to an input layer (such as the input layer 112A) of the N numbers of layers of the first neural network and select an intermediate layer of the N number of layers of the first neural network. The circuitry may be further configured to extract a first intermediate result (such as the first intermediate result 308A) as an output generated by the selected intermediate layer of the first neural network based on the input RoI. The circuitry may be further configured to share the extracted first intermediate result as compressed training data with a server (such as the server 106) for training a second neural network (such as the second neural network 118) on the object detection task.

In at least one embodiment, the selected intermediate layer may be one of: N−1 layer, N−2 layer, or N−3 layer of the N number of layers of the first neural network.

In at least one embodiment, the circuitry may be communicatively coupled to an image-capture device (such as the image-capture device 104) and may be configured to control the image-capture device to capture the first image which includes the object of interest.

In at least one embodiment, the circuitry may be further configured to extract the RoI from the received first image based on application of an RoI extraction network (such as the RoI extraction network 122) on the received first image. The RoI extraction network may be trained to determine a bounding box as the RoI around the object of interest in the received first image. The circuitry may be configured to extract the RoI by cropping a region within the bounding box.

In at least one embodiment, the first neural network may be a convolutional neural network and the extracted first intermediate result may include a convolutional feature map associated with the object of interest in the input RoI.

In at least one embodiment, the circuitry may be further configured to extract a plurality of intermediate results as an output of a plurality of layers of the N number of layers and select the first intermediate result from the extracted plurality of intermediate results. The circuitry may compare the selected first intermediate result with each of the plurality of intermediate results based on one more selection conditions and based on the comparison, select the intermediate layer that outputs the selected first intermediate result.

In at least one embodiment, the circuitry may be further configured to extract a second intermediate result (such as the second intermediate result 308B) as output of one of the N number of layers and compare the first intermediate result with the second intermediate result to generate a comparison result which may be transmitted to an electronic apparatus (such as the electronic apparatus 308C) associated with a user. The comparison result may include information which may differentiate a visual quality of the first intermediate result from that of the second intermediate result. The circuitry may be configured to receive, from the electronic apparatus, selection information as one of the one or more selection conditions for intermediate layer selection and select the intermediate layer of the N number of layers based on the one or more selection conditions.

In at least one embodiment, the circuitry may be further configured to determine network information associated with a communication network (such as the communication network 108) between the information processing device and the server. The circuitry may be further configured to select the intermediate layer based on a determination that the determined network information satisfies one or more selection conditions for intermediate layer selection. The network information may include at least one of a communication bit rate, a network topology associated with the communication network, or an encryption method associated with the communication network.

In at least one embodiment, the object of interest may include one of: a licensing plate of a vehicle, identification information of a flying object, a human face, an animate object, or an inanimate object.

In at least one embodiment, the circuitry may be further configured to receive, from the server, network parameter values of the second neural network after the second neural network is trained on the compressed training data and update the first neural network based on the received network parameter values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An information processing device, comprising:
   a memory configured to store a first neural network trained for an object detection task, wherein the first neural network comprises N number of layers; and
   circuitry configured to:
      receive a first image which includes an object of interest;
      extract, from the received first image, a region of interest (RoI) comprising the object of interest;
      input the extracted RoI to an input layer of the N numbers of layers of the first neural network;
      determine network information associated with a communication network between the information processing device and a server;
      select an intermediate layer of the N number of layers of the first neural network, wherein the intermediate layer is selected based on a determination that the determined network information satisfies at least one selection condition for intermediate layer selection;
      extract a first intermediate result as an output generated by the selected intermediate layer of the first neural network based on the input RoI; and
      share the extracted first intermediate result as compressed training data with a server for training a second neural network on the object detection task.

2. The information processing device according to claim 1, wherein the selected intermediate layer is one of N–1 layer, N–2 layer, or N–3 layer of the N number of layers of the first neural network.

3. The information processing device according to claim 1, wherein the circuitry is communicatively coupled to an image-capture device and is further configured to control the image-capture device to capture the first image which includes the object of interest.

4. The information processing device according to claim 1, wherein the circuitry is further configured to extract the RoI from the received first image based on application of an RoI extraction network on the received first image.

5. The information processing device according to claim 4, wherein
   the RoI extraction network is trained to determine a bounding box as the RoI around the object of interest in the received first image, and
   the circuitry is further configured to control extraction of the RoI by cropping a region within the bounding box.

6. The information processing device according to claim 1, wherein the first neural network is a convolutional neural network and the extracted first intermediate result comprises a convolutional feature map associated with the object of interest in the input RoI.

7. The information processing device according to claim 1, wherein the circuitry is further configured to:
   extract a plurality of intermediate results as an output of a plurality of intermediate layers of the N number of layers;
   select the first intermediate result from the extracted plurality of intermediate results;
   compare the selected first intermediate result with each of the plurality of intermediate results based on the at least one selection condition; and
   select, based on the comparison, the intermediate layer that outputs the selected first intermediate result.

8. The information processing device according to claim 1, wherein the circuitry is further configured to:
- extract a second intermediate result as output of one of the N number of layers;
- compare the first intermediate result with the second intermediate result to generate a comparison result;
- transmit the comparison result to an electronic apparatus associated with a user, wherein the comparison result includes information which differentiates a visual quality of the first intermediate result from that of the second intermediate result;
- receive, from the electronic apparatus, selection information as one of the at least one selection condition for the intermediate layer selection based on the comparison result; and
- select the intermediate layer of the N number of layers based on the at least one selection condition.

9. The information processing device according to claim 1, wherein the network information comprises at least one of a communication bit rate, a network topology associated with the communication network, or an encryption method associated with the communication network.

10. The information processing device according to claim 1, wherein the object of interest comprises one of a licensing plate of a vehicle, identification information of a flying object, a human face, an animate object, or an inanimate object.

11. The information processing device according to claim 1, wherein the circuitry is further configured to:
- receive, from the server, network parameter values of the second neural network after the second neural network is trained on the compressed training data; and
- update the first neural network based on the received network parameter values.

12. A method, comprising:
in an information processing device:
- receiving a first image which includes an object of interest;
- extracting, from the received first image, a region of interest (RoI) comprising the object of interest;
- inputting the extracted RoI to an input layer of N numbers of layers of a first neural network, wherein the first neural network is trained for an object detection task;
- determining network information associated with a communication network between the information processing device and a server;
- selecting an intermediate layer of the N number of layers of the first neural network, wherein the intermediate layer is selected based on a determination that the determined network information satisfies at least one selection condition for intermediate layer selection;
- extracting a first intermediate result as an output generated by the selected intermediate layer of the first neural network based on the input RoI; and
- sharing the extracted first intermediate result as compressed training data with a server for training a second neural network on the object detection task.

13. The method according to claim 12, further comprising extracting the RoI from the received first image based on application of an RoI extraction network on the received first image, wherein the RoI extraction network is trained to determine a bounding box as the RoI around the object of interest in the received first image.

14. The method according to claim 13, further comprising extracting the RoI by cropping a region within the bounding box.

15. The method according to claim 12, further comprising:
- extracting a plurality of intermediate results as an output of a plurality of intermediate layers of the N number of layers;
- selecting the first intermediate result from the extracted plurality of intermediate results;
- comparing the selected first intermediate result with each of the plurality of intermediate results based on the at least one selection condition for intermediate layer selection; and
- selecting, based on the comparison, the intermediate layer that outputs the selected first intermediate result.

16. The method according to claim 12, further comprising:
- extracting a second intermediate result as output of one of the N number of layers;
- comparing the first intermediate result with the second intermediate result to generate a comparison result;
- transmitting the comparison result to an electronic apparatus associated with a user, wherein the comparison result includes information which differentiates a visual quality of the first intermediate result from that of the second intermediate result;
- receiving, from the electronic apparatus, selection information as one of the at least one selection condition for intermediate layer selection based on the comparison result; and
- selecting the intermediate layer of the N number of layers based on the at least one selection condition.

17. The method according to claim 12, further comprising:
- receiving, from the server, network parameter values of the second neural network after the second neural network is trained on the compressed training data; and
- updating the first neural network based on the received network parameter values of the second neural network.

18. A non-transitory computer-readable medium having stored thereon, computer-executable instructions which, when executed by an information processing device, causes the information processing device to execute operations, the operations comprising:
- receiving a first image which includes an object of interest;
- extracting, from the received first image, a region of interest (RoI) comprising the object of interest;
- inputting the extracted RoI to an input layer of N numbers of layers of a first neural network, wherein the first neural network is trained for an object detection task;
- determining network information associated with a communication network between the information processing device and a server;
- selecting an intermediate layer of the N number of layers of the first neural network, wherein the intermediate layer is selected based on a determination that the determined network information satisfies at least one selection condition for intermediate layer selection;
- extracting a first intermediate result as an output generated by the selected intermediate layer of the first neural network based on the input RoI; and sharing the extracted first intermediate result as compressed training data with a server for training a second neural network on the object detection task.

* * * * *